US012503401B2

United States Patent
Zhao

(10) Patent No.: US 12,503,401 B2
(45) Date of Patent: Dec. 23, 2025

(54) METHOD FOR PREPARING NICKEL FERRITE-BASED EUTECTIC CERAMIC INERT ANODE MATERIAL

(71) Applicant: CHANG'AN UNIVERSITY, Xi'an (CN)

(72) Inventor: Peng Zhao, Xi'an (CN)

(73) Assignee: CHANG'AN UNIVERSITY, Xi'an (CN)

( * ) Notice: Subject to any disclaimer, the term of this patent is extended or adjusted under 35 U.S.C. 154(b) by 0 days.

(21) Appl. No.: 19/027,667

(22) Filed: Jan. 17, 2025

(65) Prior Publication Data

US 2025/0162949 A1   May 22, 2025

Related U.S. Application Data

(63) Continuation of application No. PCT/CN2024/103086, filed on Jul. 2, 2024.

(30) Foreign Application Priority Data

Dec. 27, 2023  (CN) .......... 202311818746.9

(51) Int. Cl.
| | | |
|---|---|---|
| C04B 35/26 | (2006.01) | |
| C04B 35/626 | (2006.01) | |
| C04B 35/634 | (2006.01) | |
| C04B 35/64 | (2006.01) | |
| C04B 35/653 | (2006.01) | |
| C25C 7/02 | (2006.01) | |

(52) U.S. Cl.
CPC ...... *C04B 35/2666* (2013.01); *C04B 35/6261* (2013.01); *C04B 35/6264* (2013.01); *C04B 35/62675* (2013.01); *C04B 35/62695* (2013.01); *C04B 35/63416* (2013.01); *C04B 35/64* (2013.01); *C04B 35/653* (2013.01); C04B 2235/3274 (2013.01); C04B 2235/3279 (2013.01); C04B 2235/604 (2013.01); C04B 2235/6565 (2013.01); C04B 2235/6567 (2013.01); C04B 2235/661 (2013.01); C04B 2235/666 (2013.01); C04B 2235/763 (2013.01); C04B 2235/9607 (2013.01); C04B 2235/9669 (2013.01); C25C 7/02 (2013.01)

(58) Field of Classification Search
CPC .............. C04B 35/26; C04B 35/2666; C04B 2235/763; C04B 2235/661
See application file for complete search history.

(56) References Cited

U.S. PATENT DOCUMENTS

| | | |
|---|---|---|
| 4,357,251 A | 11/1982 | Johnson, Jr. et al. |
| 4,871,438 A | 10/1989 | Marschman et al. |
| 2004/0037771 A1 | 2/2004 | Meissner et al. |

FOREIGN PATENT DOCUMENTS

| | | | |
|---|---|---|---|
| CN | 101586246 A | 11/2009 | |
| CN | 108409315 A | 8/2018 | |
| CN | 113174615 A | 7/2021 | |
| CN | 117886594 A | 4/2024 | |
| EP | 1601820 B1 * | 5/2008 | ............... C25C 3/12 |

OTHER PUBLICATIONS

Zhifeng Wang et al., "Dual-network nanoporous NiFe2O4/NiO composites for high performance Li-ion battery anodes", Chemical Engineering Journal, vol. 388, Jan. 25, 2020, pp. 1-10.
State Bureau of Quality and Technical Supervision of the People's Republic of China, "GB/T 4741-1999 Standard test method for bending strength of ceramic materials", National Standard of the People's Republic of China, Aug. 12, 1999, Entire document.

* cited by examiner

*Primary Examiner* — Khanh T Nguyen

(57) ABSTRACT

A method of preparing a nickel ferrite-based eutectic ceramic inert anode material, in which a mixture powder of $NiFe_2O_4$-based spinel powder and nickel oxide-based powder is mixed with a binder, and granulated to obtain a granular material; the granular material is subjected to compression molding under 100-200 MPa to obtain a green body, which is pre-sintered to obtain a pre-sintered body; the pre-sintered body is melted in an inert gas atmosphere to obtain a molten material; the molten material is cooled at a rate of 1-100° C./min and solidified to obtain a ceramic solidified body; and the ceramic solidified body is processed at 1250-1400° C. for 2-6 h, and cooled to room temperature at a rate of 1-50° C./min to obtain the nickel ferrate-based eutectic ceramic inert anode material.

9 Claims, No Drawings

METHOD FOR PREPARING NICKEL FERRITE-BASED EUTECTIC CERAMIC INERT ANODE MATERIAL

CROSS-REFERENCE TO RELATED APPLICATIONS

This application is a continuation of International Patent Application No. PCT/CN2024/103086, filed on Jul. 2, 2024, which claims the benefit of priority from Chinese Patent Application No. 202311818746.9, filed on Dec. 27, 2023. The content of the aforementioned application, including any intervening amendments thereto, is incorporated herein by reference in its entirety.

TECHNICAL FIELD

This application relates to aluminum electrolysis, and more specifically to a method for preparing a nickel ferrite-based eutectic ceramic inert anode material.

BACKGROUND

Owing to excellent electrical conductivity and resistance to high-temperature molten salt corrosion, nickel ferrite ceramics have been widely investigated in the aluminum electrolysis industry. Moreover, adopting such ceramic materials as inert anode materials can reduce carbon emissions in the aluminum electrolysis process.

To achieve a balance among densification, mechanical properties and electrical conductivity and high-temperature molten salt corrosion resistance, various oxide components are generally introduced to the nickel-ferrate-based ceramic inert anode material to improve their electrical conductivity and resistance to thermal shock and corrosion, thereby arriving at a wide variety of ceramic anode materials.

It has been demonstrated by the test under actual production conditions that through the high-temperature molten salt corrosion test procedure, such ceramic inert anode materials are more prone to corrosion at the grain boundary in the electrolysis process, resulting in the formation of micropores on the ceramic inert anode surface. These micropores provide permeation channels for the high-temperature molten salt electrolyte, thereby accelerating electrochemical corrosion and chemical corrosion of the ceramic inert anode.

In the prior art, many sintering methods have been proposed for improving the densification of the ceramic anode materials, but these methods fail to effectively enhance the corrosion resistance, thermal shock resistance and electrical conductivity. In addition, the traditional ceramic production process is not suitable for the sintering of large-size ceramic anodes. In view of the complex molding and sintering processes, it is a great challenge to achieve the industrialized manufacturing of such ceramic anode materials. Consequently, it is urgently needed to develop an easy-to-operate and cost-effective ceramic anode preparation strategy suitable for the large-scale industrial production to achieve the carbon emission reduction in the aluminum electrolysis industry.

SUMMARY

An objective of the present disclosure is to provide a method of preparing a nickel ferrite-based eutectic ceramic inert anode material to overcome the deficiencies in the prior art.

Technical solutions of the present disclosure are described below.

A method of preparing a nickel ferrite-based eutectic ceramic inert anode material, comprising:
(1) mixing a mixture powder of a $NiFe_2O_4$-based spinel powder and a nickel oxide-based powder with a binder, followed by granulation to obtain a granular material with a size of 10-30 mesh; subjecting the granular material to compression molding under 100-200 MPa to obtain a green body; and pre-sintering the green body at 1,100-1,300° C. for 2-5 h in a first inert gas atmosphere to obtain a pre-sintered body;
wherein the $NiFe_2O_4$-based spinel powder is 80-90% by weight of the mixture powder, and the nickel oxide-based powder is 10-20% by weight of the mixture powder; the binder is selected from the group consisting of polyvinyl alcohol, polyethylene glycol and a combination thereof; and the binder is 0.5-2% by weight of the mixture powder;
(2) melting the pre-sintered body in a second inert gas atmosphere to obtain a molten material; cooling and solidifying the molten material at a rate of 1-100° C./min, or casting the molten material followed by cooling and solidification at a rate of 1-100° C./min to obtain a ceramic solidified body; and
(3) processing the ceramic solidified body at 1250-1400° C. for 2-6 h, followed by cooling to room temperature at a rate of 1-50° C./min to obtain the nickel ferrate-based eutectic ceramic inert anode material.

In an embodiment, the $NiFe_2O_4$-based spinel powder comprises 20-80 wt. % of $NiFe_2O_4$, 0-20 wt. % of $ZnFe_2O_4$, 0-20 wt. % of $CuFe_2O_4$, 0-20 wt. % of $CoFe_2O_4$ and 0-20 wt. % of $MnFe_2O_4$, wherein an endpoint value 0% is excluded.

In an embodiment, the the nickel oxide-based powder comprises 20-80 wt. % of NiO, 0-20 wt. % of CaO, 0-20 wt. % of $CeO_2$, 0-20 wt. % of $ZrO_2$, 0-20 wt. % of $Al_2O_3$, and 0-20 wt. % of $V_2O_5$, wherein an endpoint value 0% is excluded.

In an embodiment, the the nickel oxide-based powder in the mixture powder is pure NiO.

In an embodiment, a particle size of the mixture powder is less than 100 mesh.

In an embodiment, the mixture powder is prepared through steps of:
subjecting the $NiFe_2O_4$-based spinel powder, the nickel oxide-based powder, a dispersant and water to ball milling for 12-24 h to obtain a ceramic slurry; and
drying the ceramic slurry followed by grinding to obtain the mixture powder;
wherein the dispersant is selected from the group consisting of ethanol, ethylene glycol, propylene glycol and a combination thereof; and the dispersant is 1-5% of a total weight of the $NiFe_2O_4$-based spinel powder and the nickel oxide-based powder; and
the water is 3-5 times the total weight of the $NiFe_2O_4$-based spinel powder and the nickel oxide-based powder.

In an embodiment, in step (2), the pre-sintered body is melted in the second inert gas atmosphere at 1650-1850° C. for 1-2 h to obtain the molten material.

In an embodiment, in step (2), the pre-sintered body is melted through arc melting, spark plasma melting, laser floating zone melting (LFZM), optical floating zone melting, selective electron beam melting, high-frequency electromagnetic induction melting, Joule heating, or a combination thereof.

In an embodiment, the nickel ferrate-based eutectic ceramic inert anode material has a relative density of 99-100%, a thermal shock resistance of 95-120%, a flexural strength of 70-110 MPa, a corrosion resistance of 5-50 μm, and an electrical conductivity of 8-30 S/cm.

The present disclosure has at least the following beneficial effects.

The eutectic ceramic preparation technology is used herein to obtain a dense nickel ferrite-based eutectic ceramic. Regarding the nickel ferrite-based eutectic ceramic provided herein, the corrosion of ceramic grain boundaries is greatly relieved, and the density, conductivity, mechanical properties and corrosion resistance are significantly enhanced. In the meanwhile, through the ceramic melting and casting molding, this application effectively simplifies the preparation process compared to the traditional ceramic preparation, thereby facilitating the efficient and industrial production of the ceramic anode material.

The method provided by the present disclosure substantially improves the density of nickel ferrite-based ceramic materials, eliminates the grain boundary defects existing in the traditional ceramic sintering process, and enhances the overall performance of the ceramic materials, including corrosion resistance, electrical conductivity, and mechanical properties. The preparation process of the present disclosure has a simple and convenient molding step, and can achieve the ceramic shape and size control, making it suitable for industrial production.

DETAILED DESCRIPTION OF EMBODIMENTS

Unless otherwise indicated, scientific and technical terms used herein have the same meaning as commonly understood by one of ordinary skill in the art.

The present disclosure provides a method of preparing a nickel ferrate-based eutectic ceramic inert anode material. The nickel ferrate-based eutectic ceramic inert anode material is pre-sintered, directly melted at high temperature (the melting temperature can be determined according to the composition and properties of the materials to heat and melt the pre-sintered body in a reasonable time), and then cooled and cured, or casted followed by cooling and curing. In the specific embodiment, the chemical composition of ceramics, the melting temperature, the melting atmosphere, the cooling rate and the post-curing heat treatment can be controlled to obtain nickel ferrate-based eutectic ceramics with excellent performances.

It should be noted that the temperatures and dosages of substances involved herein are approximate, and are merely illustrative. While methods and materials similar or equivalent to those described herein may be used in embodiments of the present disclosure, partially suitable methods and raw materials are described below. Further, the described raw materials, dosages, and embodiments are merely exemplary and are not intended to limit the present disclosure. In specific embodiments, one of ordinary skill in the art may optimize the raw materials, substance dosages, and operating parameters involved in the method to achieve the purpose of the present disclosure in accordance with the disclosure of the present invention by using conventional experimental skills.

The raw materials used in the following embodiments are commercially available, and the composition of the materials is analytically pure.

The $NiFe_2O_4$-based spinel used in the following embodiments is composed of 79.6 wt. % of $NiFe_2O_4$, 5.8 wt. % of $ZnFe_2O_4$, 2.6 w.t % of $CuFe_2O_4$, 0.9 wt. % of $CoFe_2O_4$ and 10.4 wt. % of $MnFe_2O_4$.

The nickel oxide-based powder used herein is composed of 78.3 wt. % of NiO, 11.5 wt. % of CaO, 0.8 wt. % of $CeO_2$, 1.1 wt. % of $ZrO_2$, 6.7 wt. % of $Al_2O_3$ and 1.4 wt. % of $V_2O_5$.

The properties of the materials described herein are measured as follows.

The compactness of the materials is measured by the Archimedes drainage method, and is the ratio of the actual density to the theoretical density.

The thermal shock resistance of the materials is measured as follows: the material is placed into a 960° C. high-temperature furnace for insulation for 10 min and then cooled to a room temperature in the air to complete a thermal shock. After that, the material is subjected to a flexural strength test. The residual rate of strength is the ratio of strength of the material before and after the thermal shock, and represents the thermal shock resistance. The greater the residual rate of strength, the better the thermal shock resistance.

The mechanical property is represented by the flexural strength, which is measured with reference to GB/T 4741-1999.

The resistance to the high-temperature corrosion is measured as follows. $NiFe_2O_4$ eutectic ceramic inert anode materials obtained at different sintering temperatures are subjected to high-temperature molten salt static corrosion experiments. The inert anode materials are placed in a high-purity graphite crucible containing a sufficient amount of an electrolyte, which is composed of 90 wt. % of industrial cryolite (molecular ratio (ratio of $NaF/AlF_3$)=2.2), 5 wt. % of $CaF_2$ and 5 wt. % of $Al_2O_3$. The inert anode materials are immersed at 960° C. for 8 h, and is taken out for cooling. After that, the inert anode materials were subjected to water-bath heating in a 30 wt. % $AlCl_3$ solution followed by rinse with water to remove the residues on the surface of the materials. The materials are then subjected to scanning electron microscope (SEM) and electronic differential system (EDS) elemental analysis. The thickness of the corrosion layer of the material is measured under a microscope, representing the high temperature corrosion resistance of the material.

The conductivity of the materials is determined as follows. The current through a unit area and a unit length of the sample under a constant voltage at 960° C. is measured, and the conductivity of the material is calculated according to Ohm's law.

Based on the above testing methods, the material prepared by the present disclosure has a compactness of 99-100%, a thermal shock of 95-120%, a flexural strength of 70-110 MPa, a high-temperature corrosion resistance of 5-50 microns, and an electrical conductivity of 8-30 S/cm.

Example 1

Provided was a method of preparing a nickel ferrite-based eutectic ceramic inert anode material, which included the following steps.
(1) Preparation of a Pre-Sintered Body 85 wt. % of $NiFe_2O_4$-based spinel powder, 15 wt. % of nickel oxide-based powder, ethanol and water were mixed and subjected to ball milling for 14 h to obtain a ceramic slurry with a particle size smaller than 200 mesh, where the ethanol was 5% by weight of a total weight of the $NiFe_2O_4$- based spinel powder and the nickel oxide-based powder, and a weight of the water was 4 times the total weight of the $NiFe_2O_4$-based spinel powder and the nickel oxide-based powder. The ceramic slurry was dried at 150±10° C. and ground to obtain a mixture powder with a particle size less than 100 mesh. After that, polyvinyl alcohol was added as a binder, followed by granulation to form a granular material with a particle size of 10-30 mesh, where the polyvinyl alcohol is 1.5 wt. % by weight of the mixture powder. The granular material was subjected to pressing and molding under 150 MPa to obtain a green body. The green body was pre-sintered at 1,200±100° C. in the nitrogen protective atmosphere for 4 h to obtain the pre-sintered body.

(2) Melting, Cooling and Curing of the Pre-Sintered Body

The pre-sintered body was placed in a discharge plasma sintering SPS equipment for melting at 1,650-1,850° C. in the argon protective atmosphere for 2 h to obtain a molten material. The molten material was cooled and cured at a cooling rate of 80±5° C./min to obtain a ceramic cured body.

(3) Crystallization Heat Treatment

The ceramic cured body was subjected to crystallization and annealing treatment in a muffle furnace at 1,250-1,400° C. for 6 h for adjusting the microstructure and eliminating the stress, and cooled down to a room temperature at a cooling rate of 30±5° C./min to obtain the nickel ferrite-based eutectic ceramic inert anode material.

The nickel ferrite-based eutectic ceramic inert anode material obtained in this Example had a compactness of 99.8%, an electrical conductivity of 25 S/cm, a flexural strength (mechanical property) of 89 MPa, a once residual strength ratio (thermal shock) of 102%, and a high-temperature corrosion resistance of 15 micrometers.

Example 2

The method provided in this example was basically the same as that in Example 1, except that the raw materials used in this example were different from that in Example 1. Specifically, in this example, 80 wt. % of $NiFe_2O_4$-based spinel powder, 20 wt. % of nickel oxide-based powder, glycerol and water were used as raw materials, where the glycerol was 1% by weight of a total weight of the $NiFe_2O_4$-based spinel powder and the nickel oxide-based powder, and a weight of the water was 5 times the total weight of the $NiFe_2O_4$-based spinel powder and the nickel oxide-based powder.

The nickel ferrite-based eutectic ceramic inert anode material obtained in this Example had a compactness of 99.3%, an electrical conductivity of 23 S/cm, a flexural strength (mechanical property) of 91 MPa, a once residual strength ratio (thermal shock) of 98%, and a high-temperature corrosion resistance of 17 micrometers.

Example 3

The method provided in this example was basically same as that in Example 1, except that the raw materials used in this example were different from that in Example 1. Specifically, in this example, 90 wt. % of $NiFe_2O_4$-based spinel powder, 10 wt. % of nickel oxide powder, glycerol and water were used as raw materials, where the glycerol was 4 wt. % by weight of a total weight of the $NiFe_2O_4$-based spinel powder and the nickel oxide powder, and a weight of the water was 3 times the total weight of the $NiFe_2O_4$-based spinel powder and the nickel oxide powder.

The nickel ferrite-based eutectic ceramic inert anode material obtained in this Example had a compactness of 99.5%, an electrical conductivity of 28 S/cm, a flexural strength (mechanical property) of 107 MPa, a once residual strength ratio (thermal shock) of 117%, and a high-temperature corrosion resistance of 5 micrometers.

The molten material obtained in the above embodiments could also be cast in an anode mold and then cooled under the same conditions, which would not affect the properties of the resulted materials.

What is claimed is:

1. A method of preparing a nickel ferrite-based eutectic ceramic inert anode material, comprising:
    (1) mixing a mixture powder of a $NiFe_2O_4$-based spinel powder and a nickel oxide-based powder with a binder, followed by granulation to obtain a granular material with a size of 10-30 mesh; subjecting the granular material to compression molding under 100-200 MPa to obtain a green body; and pre-sintering the green body at 1,100-1,300° C. for 2-5 h in a first inert gas atmosphere to obtain a pre-sintered body;
    wherein the $NiFe_2O_4$-based spinel powder is 80-90% by weight of the mixture powder, and the nickel oxide-based powder is 10-20% by weight of the mixture powder; the binder is selected from the group consisting of polyvinyl alcohol, polyethylene glycol and a combination thereof; and the binder is 0.5-2% by weight of the mixture powder;
    (2) melting the pre-sintered body in a second inert gas atmosphere to obtain a molten material; cooling and solidifying the molten material at a rate of 1-100° C./min, or casting the molten material followed by cooling and solidification at a rate of 1-100° C./min to obtain a ceramic solidified body; and
    (3) processing the ceramic solidified body at 1250-1400° C. for 2-6 h, followed by cooling to room temperature at a rate of 1-50° C./min to obtain the nickel ferrate-based eutectic ceramic inert anode material.

2. The method of claim 1, wherein the $NiFe_2O_4$-based spinel powder comprises 20-80 wt. % of $NiFe_2O_4$, 0-20 wt. % of $ZnFe_2O_4$, 0-20 wt. % of $CuFe_2O_4$, 0-20 wt. % of $CoFe_2O_4$ and 0-20 wt. % of $MnFe_2O_4$, wherein an endpoint value 0% is excluded.

3. The method of claim 1, wherein the nickel oxide-based powder comprises 20-80 wt. % of NiO, 0-20 wt. % of CaO, 0-20 wt. % of $CeO_2$, 0-20 wt. % of $ZrO_2$, 0-20 wt. % of $Al_2O_3$, and 0-20 wt. % of $V_2O_5$, wherein an endpoint value 0% is excluded.

4. The method of claim 1, wherein the nickel oxide-based powder is pure NiO.

5. The method of claim 1, wherein a particle size of the mixture powder of the $NiFe_2O_4$-based spinel powder and the nickel oxide-based powder is less than 100 mesh.

6. The method of claim 1, wherein the mixture powder is prepared through steps of:
    subjecting the $NiFe_2O_4$-based spinel powder, the nickel oxide-based powder, a dispersant and water to ball milling for 12-24 h to obtain a ceramic slurry; and
    drying the ceramic slurry followed by grinding to obtain the mixture powder;
    wherein the dispersant is selected from the group consisting of ethanol, ethylene glycol, propylene glycol and a combination thereof, and the dispersant is 1-5% of a total weight of the $NiFe_2O_4$-based spinel powder and the nickel oxide-based powder; and
    the water is 3-5 times the total weight of the $NiFe_2O_4$-based spinel powder and the nickel oxide-based powder.

7. The method of claim 1, wherein in step (2), the pre-sintered body is melted in the second inert gas atmosphere at 1650-1850° C. for 1-2 h to obtain the molten material.

8. The method of claim 1, wherein in step (2), the pre-sintered body is melted through arc melting, spark plasma melting, laser floating zone melting (LFZM), optical floating zone melting, selective electron beam melting, electromagnetic induction melting, Joule heating, or a combination thereof.

9. The method of claim 1, wherein the nickel ferrate-based eutectic ceramic inert anode material has a relative density of 99-100%, a thermal shock resistance of 95-120%, a flexural strength of 70-110 MPa, a corrosion resistance of 5-50 μm, and an electrical conductivity of 8-30 S/cm.

* * * * *